May 26, 1959
R. J. BONDLEY ET AL
2,888,406
CONDUCTIVE CEMENTS
Filed Oct. 6, 1955
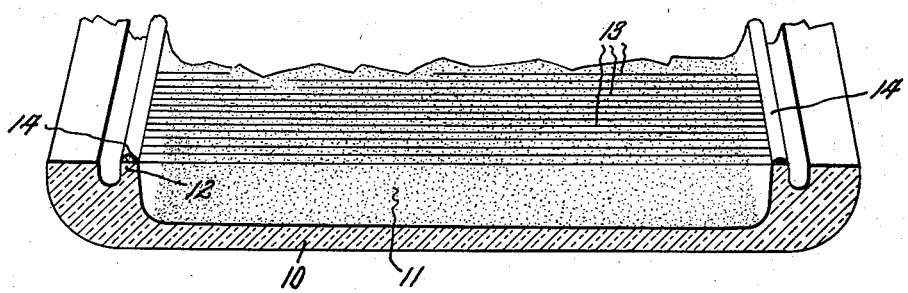
Inventors:
Ralph J. Bondley;
Marvin E. Knoll,
by Richard R. Brainard
Their Attorney.

2,888,406
CONDUCTIVE CEMENTS

Ralph J. Bondley, Scotia, and Marvin E. Knoll, Altamont, N.Y., assignors to General Electric Company, a corporation of New York Application October 6, 1955, Serial No. 538,872

2 Claims. (Cl. 252—516)

Our invention relates to improved cements for bonding together metal and insulating parts and particularly to cements suitable for bonding such parts together within a vacuum tube envelope.

Our invention also contemplates an improved cemented assembly of glass and metal parts for use in vacuum devices.

Many cements are available commercially for bonding together glass parts or glass and metal parts. All of these cements, however, have one or more disadvantages for certain applications, such as found in the construction of some types of color television picture tubes, for example. In the manufacture of these tubes, a large number of very fine wires are supported in spaced relation behind the color phosphor screen and maintained in fixed position. In some tubes it is desirable that the wires be electrically connected together by a material having only a moderately high resistance. The resistance should be low enough so that the cement may be considered conductive for the very small currents involved. In the manufacture of these tubes, the entire structure is subjected to a vacuum bake-out at an elevated temperature in the order of 400° C. and it is essential that any cement used for bonding the metal wires to the glass be able to withstand this bake-out. It is an additional requirement that no gases be given off during the bake-out or during subsequent operation of the tube due either to temperature or electron bombardment which would tend to contaminate or "poison" the oxide cathode commonly used in tubes of this type.

Our invention relates to an improved cement which satisfactorily meets all of these requirements and in addition drys quickly and attains sufficient strength to retain the wires under tension. Our cement includes as essential ingredients a mixture of powdered aluminum silicate and aluminum phosphate which is formed into a liquid paste by means of a dilute water solution of phosphoric acid. To the powdered aluminum silicate and aluminum phosphate may be added a suitable powdered filler which controls the strength and, if desired, the conductivity of the resultant cement. The amount of the filler is determined primarily by the strength requirements and the conductivity characteristics desired.

It is accordingly an important object of our invention to provide a new and improved cement for bonding together glass and metal parts within a vacuum tube envelope.

It is another object of our invention to provide a new and improved cement for glass and metal parts which may be air-dried to a point of substantial strength in a short time and which will withstand temperatures encountered in vacuum tube processing.

It is another object of our invention to provide an improved cemented assembly of glass and metal parts which is reasonably strong and which does not give off gas under electron bombardment or at elevated temperatures.

Further objects and advantages of our invention will become apparent from the following detailed description thereof and by reference to the single figure of the accompanying drawing illustrating in perspective a portion of a face plate assembly of a color television picture tube embodying our invention.

As an example of a specific cement embodying our invention, powdered aluminum silicate and aluminum phosphate are each fired separately to a temperature of about 600° C. and then ground together in a ball mill in weight proportions of 2 parts of aluminum silicate to 1 part of aluminum phosphate to provide an intimate mixture of these materials. The mixture is then converted into a paste by the addition of a dilute water solution of phosphoric acid. This acid may be purchased readily as an 85% water solution which is further let down by the addition of 2½ parts water to 1 part of the 85% solution of acid giving a concentration of about 34%. The cement is rendered conductive by the addition of a conductive filler. A finely divided (170 mesh or finer) 50% ferrosilicon alloy is added to the cement in an amount by weight equal to 3 times that of the combined weights of the aluminum phosphate and aluminum silicate. The cement thus prepared has a relatively high electrical conductivity, for example, a few ohms per centimeter cubed. Since this cement dries relatively rapidly in air, it is desirable, particularly if a considerable time is expected to elapse after preparation before it is used, to maintain it refrigerated at a temperature approaching 0° C., for example.

Before describing the application of the cement to an assembly of glass and metal parts, it is believed desirable to discuss briefly the variations in the constituents of the cement that may be made and in general the effect of these changes on the character of the resulting cement. The aluminum phosphate and aluminum silicate are available in commercially pure form and are preferred although the natural product, Georgia kaolin, such as used in the manufacture of porcelain and which is substantially aluminum silicate, may be substituted for the commercially pure aluminum silicate. These materials may also be fired together if desired although a separate firing is considered preferable. The weight ratios of 2 parts of aluminum phosphate to 1 part aluminum silicate gives a cement of very near to maximum strength. These percentages may be varied substantially, however, before the cement becomes so weak as to be useless. Weight ratios of aluminum silicate to aluminum phosphate of 4 to 1 provide a cement of substantial strength and in the other direction, ratios of 1 to 1 are suitable.

The amount of phosphoric acid used may also be varied and the preferred amount is readily determined by observing the results obtained. If there is too much phosphoric acid, the cement tends to be slow drying and when dry has a glossy appearance. Cements having an excess of acid also tend to be hygroscopic. If, on the other hand, insufficient acid is used, the cement tends to be soft and subject to cracking upon drying. If the amount of liquid provides the desired consistency of the paste, it is apparent that the amount of phosphoric acid may be suitably increased or decreased by increasing or decreasing the concentration of the acid solution used. Concentrations in the range of 20% to 50% may be used, these solutions being prepared, for example, from the 85% solution by the addition of water in amounts of approximately 4 parts to 1 for the lower concentration and 1¾ parts to 1 for the higher concentration.

In the preceding specific example, a 50% ferrosilicon alloy was employed as a filler for producing a conductive cement. The amount and character of filler employed is subject to a substantial variation depending upon the nature and properties of the final cement desired, it being necessary, however, that the filler be reasonably inert with respect to the phosphoric acid. Fillers in amounts up to about 10 parts by weight to 1 part of the combined weight of aluminum phosphate and aluminum silicate may be used with the maximum strength of the resulting cement occurring for an amount of filler substantially less than this amount. A very good cement may be produced by using 3 parts of filler by weight to 1 part of the combined weight of aluminum silicate and aluminum phosphate. With the ferrosilicon alloy, a relatively high conductivity cement results from this percentage. It is not essential that the ferrosilicon alloy be 50–50% and may, for example, be 75% silicon. Also other conducting or non-conducting fillers may be used. For example, manganese dioxide, a number of metal borides, such as molybdenum boride, hafnium boride, chromium boride and nickel boride, or certain carbides, such as silicon carbide and nickel carbide, may be used when conductive fillers are desired. Inert fillers, such as alumina or silica, may also be used if a non-conductive cement is desired.

Referring now to the drawing, we have shown our invention embodied in a cemented assembly including the face plate and wire grid assembly for color television picture tubes. The face plate and grid assembly may to advantage be of the type described and claimed in Fischer-Colbrie application, Serial No. 538,940, filed concurrently herewith, now Patent No. 2,842,696, entitled "Color Cathode Ray Image Producing Tube and Methods," and assigned to the assignee of this application. As shown in the drawing, the face plate is a pressed glass structure including a viewing area 10 on the inside of which is applied the phosphor layer which is illustrated schematically at 11. Within the tube and separated from the screen is an annular ledge or flange 12, surrounding the viewing area, to which the grid wires are secured. These wires are of very small diameter, for example, in the order of .003 inch in diameter and must be secured under tension in closely spaced (30 wires per inch) parallel relation to the ledge or flange 12. The wires may be one of the stainless steel compositions and are stretched over the flange 12 and a layer of cement, prepared in accordance with the foregoing description, applied over the wires and flange 12 as illustrated at 14 in the drawing. The wires are held under tension until the cement has gained sufficient strength to hold them in place. The cement gains substantial strength as soon as the moisture is driven off. This may be accomplished by air-drying at a temperature of 80° C. to 85° C. for a period of about 10 minutes.

Further drying and hardening of the cement may be accomplished by further heating at a higher temperature. In the particular embodiment just described, this is accomplished after the tube is assembled during the bakeout of the tube. The cement embodying our invention is capable of withstanding temperatures higher than those ordinarily encountered in the manufacture of tubes which as previously mentioned is in the order of 400° C. Temperatures in the order of 700° C. may be withstood without detrimentally affecting the properties of the cement. Total drying time required for the cement is relatively short and the attachment of the wires to the face plate may be carried out successfully on a production line basis.

While our invention has been described particularly as applied to and assembly for use within a vacuum tube envelope where the combination of properties exhibited by it are most useful, it may also be used in other applications where one or more of the properties discussed above is desired. For example, it may be used as a base cement for securing the base to the envelope of a lamp or electron tube.

What we claim as new and desire to secure by Letters Patent of the United States is:

1. A conductive cement consisting essentially of a conductive mixture of powered aluminum silicate, aluminum phosphate in a weight ratio of silicate to phosphate between 1 and 4 and an electrically conductive filler formed into a liquid paste by the addition of a dilute water solution of phosphoric acid.

2. An electrically conductive cement consisting essentially of powered aluminum silicate and aluminum phosphate in the weight ratio of silicate to phosphate between 1 and 4 and a conductive filler selected from the group consisting of manganese dioxide, molybdenum boride, hafnium boride, chromium boride, nickel boride, silicon carbide, nickel carbide, and ferrosilicon and formed into a liquid paste by the addition of a dilute water solution of phosphoric acid.

References Cited in the file of this patent

UNITED STATES PATENTS

| | | |
|---|---|---|
| 2,072,212 | Moosdorf et al. | Mar. 2, 1937 |
| 2,174,853 | Bowie | Oct. 3, 1939 |
| 2,218,058 | Stalhane | Oct. 15, 1940 |
| 2,450,952 | Greger | Oct. 12, 1948 |
| 2,505,066 | Rulison | Apr. 25, 1950 |